United States Patent [19]

Langenbacher et al.

[11] Patent Number: 4,995,506

[45] Date of Patent: Feb. 26, 1991

[54] CONVEYOR INCLUDING AN ENDLESS FLEXIBLE CONVEYING ELEMENT AND A TENSIONING DEVICE FOR THE CONVEYING ELEMENT

[75] Inventors: Markus Langenbacher, Kornwestheim; Gernot Maier, Stuttgart, both of Fed. Rep. of Germany

[73] Assignee: Robert Bosch GmbH, Stuttgart, Fed. Rep. of Germany

[21] Appl. No.: 427,856

[22] PCT Filed: Nov. 21, 1987

[86] PCT No.: PCT/DE87/00541
§ 371 Date: Sep. 19, 1989
§ 102(e) Date: Sep. 19, 1989

[87] PCT Pub. No.: WO88/07489
PCT Pub. Date: Oct. 6, 1988

[30] Foreign Application Priority Data

Mar. 27, 1987 [DE] Fed. Rep. of Germany ....... 3710044

[51] Int. Cl.⁵ ............................................. B65G 23/44
[52] U.S. Cl. .................................................... 198/814
[58] Field of Search ................................ 198/813, 814

[56] References Cited

U.S. PATENT DOCUMENTS 2,612,988 10/1952 Andrews ............................ 198/814

FOREIGN PATENT DOCUMENTS 727890 10/1942 Fed. Rep. of Germany ...... 198/814
1220786 7/1966 Fed. Rep. of Germany ...... 198/814
3306079 9/1984 Fed. Rep. of Germany .
0580157 11/1977 U.S.S.R. .............................. 198/814
693366 7/1953 United Kingdom .

Primary Examiner—D. Glenn Dayoan
Attorney, Agent, or Firm—Michael J. Striker

[57] ABSTRACT

A conveyor comprises an endless, flexible conveying element, a drive unit for driving the conveying element, a deflecting unit for reversing direction of movement of the conveying element, and at least one tensioning device. The tensioning device includes a displaceable tensioning element engaging the conveying element, a tensioning spring biasing the tensioning element toward the conveying element, and a unidirectional blocking mechanism which blocks a displacing movement of the tensioning element in a direction opposite the effective direction of the tensioning spring for automatic readjustment of the conveying element while maintaining the possibility of the reversing operation. The blocking action of the blocking mechanism can be cancelled by an unlocking key, and the tensioning device can be slid back into a locking position to allow the disassembly of the conveying element.

8 Claims, 3 Drawing Sheets

CONVEYOR INCLUDING AN ENDLESS FLEXIBLE CONVEYING ELEMENT AND A TENSIONING DEVICE FOR THE CONVEYING ELEMENT

BACKGROUND OF THE INVENTION

The invention relates to a conveyor comprising an endless, flexible conveying element, such as a conveyor belt or chain, or the like.

Such endless conveyors, also called conveyor or assembly belts, are used, depending on their purpose of application, for conveying bulk or piece goods, or for transporting workpieces which are generally held on a pallet.

In a known endless conveyor of this type with elastic conveyor belt (DE-OS No. 33 06 079), the tensioning device with conveyor belt guide required for keeping the endless conveyor belt tight, is constructed as a tensioning roller which is arranged in the drive station between two synchronously driven deflecting rollers. The axle of the tensioning roller is provided with two adjustable bearings which can be adjusted radially by two tensioning screws arranged laterally at the bearing frame, so that the tensioning of the conveyor belt can be readjusted manually from time to time.

SUMMARY OF THE INVENTION

The object of the invention is a conveyor comprising an endless flexible conveying element tensioning of which is maintained automatically without the necessity of re-tensioning over time. The reversing operation of the conveyor is ensured by the blocking mechanism of the tensioning device, which blocking mechanism acts on one side and is only effective in a direction which is opposite the tensioning direction. When the conveying element is driven in a reverse operation, the blocking device prevents the tensioning spring from being compressed by the tractive force of the drive. The conveying element tension last adjusted prior to the beginning of the reversing operation is maintained so as to be unchanged. If the conveyor is driven exclusively in reversing operation, the automatic re-tensioning of the conveying element is effected in the turned-off phases of the conveyor.

In an advantageous embodiment of the invention, the blocking mechanism comprises a manually actuated unlocking key for cancelling the blocking action of the mechanism. The key is used for slackening of the conveying element for assembly purposes. A lock which can be triggered as desired in the rear end position of the tensioning member when the tensioning spring is extensively compressed, which can be realized in a simple manner, e.g. by providing a locking groove at the end of a tooth row of the blocking mechanism in which groove a locking projection that can be lifted only by actuation of the unlocking key, is received ensures an easy assembly and disassembly of the conveying element when the tensioning member is installed without disassembling it beforehand.

The present invention both as to its construction so to its mode of operation, together with additional objects and advantages thereof, will be best understood from the following detailed description of preferred embodiments with reference to the appended drawings.

DESCRIPTION OF THE PREFERRED EMBODIMENT

Figure 1:
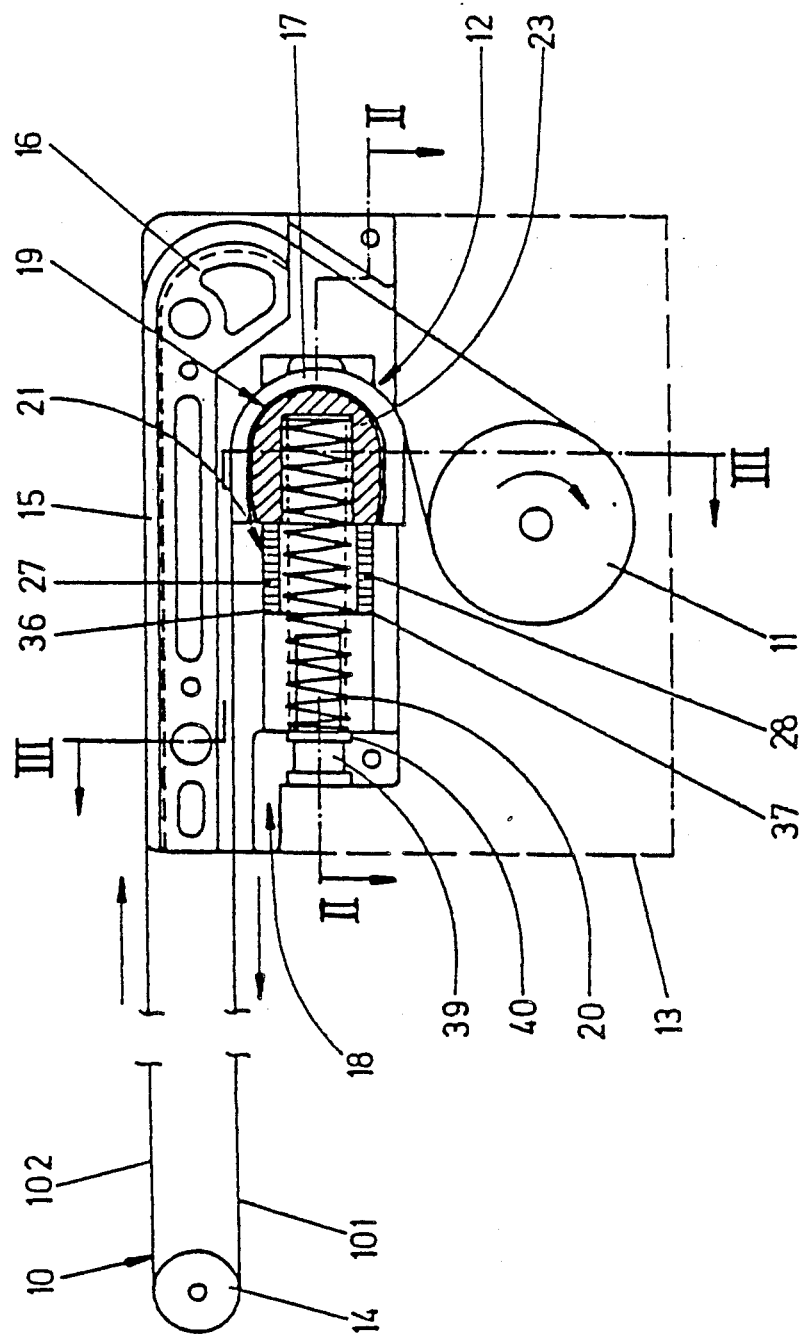
FIG. 1 shows a schematic partial side view of a conveyor according to the invention with an endless conveyor chain.

The chain conveyor shown schematically in FIG. 1, comprises an endless conveying chain 10 which is driven in the direction indicated by arrows in the normal operation of the conveyor by a drive 11 comprising a toothed roller or toothed wheel driven electromechanically. The drive 11 is combined together with a tensioning device 12 for the conveying chain 10 in a drive station 13. A lower portion 101 (return portion) of the conveying chain 10 runs from the drive station 13 to a deflecting roller 14, and an upper portion 102 (pulling portion) of the conveying chain 10 serving to transport runs back to the drive station 13 again from the deflection roller 14. In the drive station 13, the upper chain portion 102 is guided in a track rail 15 and is guided to the drive 11 via a deflecting portion 16. The tensioning device 12 is arranged in the lower portion 101 of the conveying chain 10, that is, between the drive 11 and the deflecting portion 16, wherein the conveying chain 10 runs along a guide 17 of the transporting device 12. The tensioning device 12 with guide 17 acts on the conveying chain 10 in such a way that the looping angle of the conveying chain on the conveying chain guide 17 is smaller than 180°, and the looping angle of the conveying chain 10 at the toothed roller or the toothed wheel of the drive 11 is greater than 180°. The tensioning device 12 is combined with the track rail 15 and the deflecting portion 16 to form a constructional unit which is generally designated as a chain tightener. As can be seen from FIGS. 1 and 3, the track rail 15 and the deflecting portion 16 are arranged on the upper side of a section housing 18 so as to form one piece with the latter, while the tensioning device 12 is arranged in the interior of the section housing 18.

Figure 2:
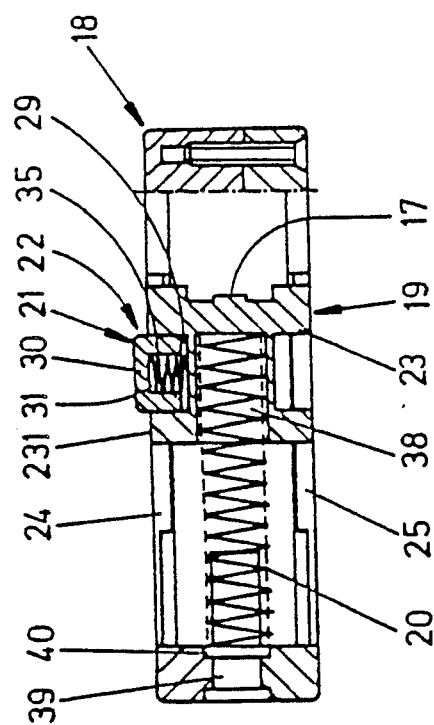
FIG. 2 shows a sectional view of a tensioning device along line II—II in FIG. 1.
Figure 3:
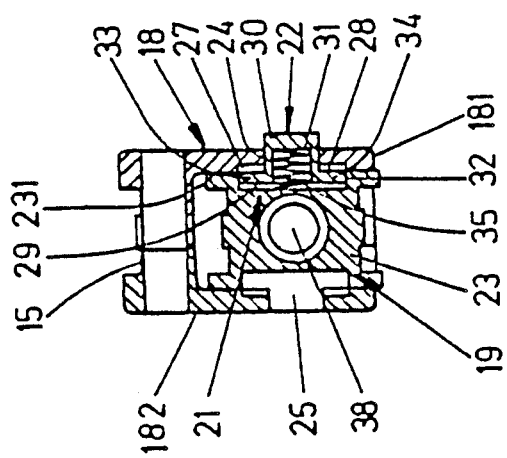
FIG. 3 shows a section of the tensioning device according to line III—III in FIG. 1.
Figure 4:
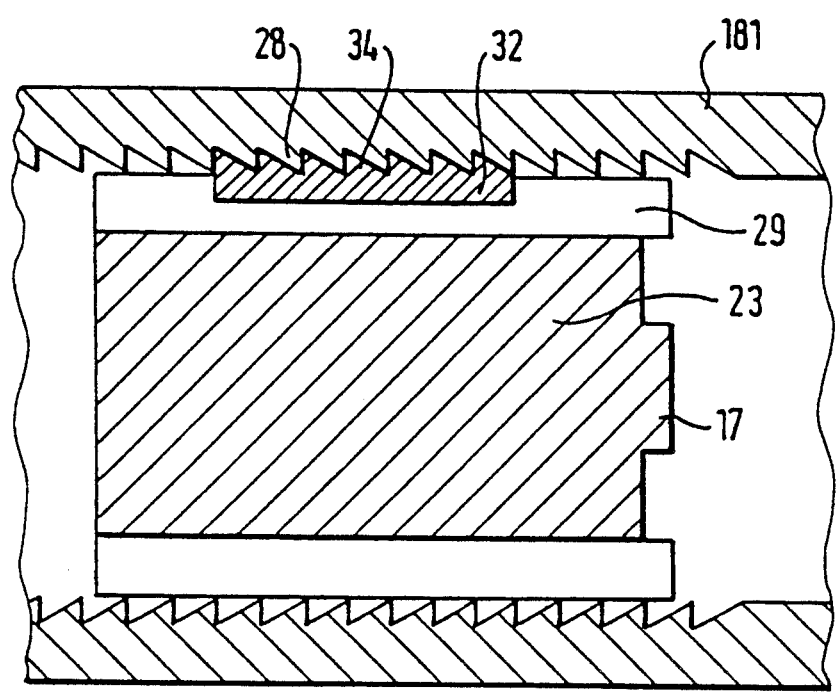
FIG. 4 shows an enlarged cross-sectional view along line IV—IV in FIG. 3.

The tensioning device 12 comprises in particular a displaceable tensioning element 19 which carries the conveying chain guide 17 on its front side, a tensioning spring 20 which acts upon the tensioning element 19 in the direction of the conveying chain guide 17, and a blocking mechanism 21 which acts in one direction only in the manner of a ratchet coupling and blocks a displacing movement of the tensioning element 19 in a direction opposite the acting direction of the tensioning spring 20. The action of the blocking mechanism 21 can be canceled manually by an unlocking or releasing key 22 (FIGS. 2 and 3). As can be seen particularly from FIGS. 2 and 3, the tensioning element 19 is constructed as a carriage 23 which is longitudinally displaceable in longitudinal guides 24, 25 arranged in the two side legs 181, 182 of the section housing 18. A tooth row 27, 28 is arranged above and below the longitudinal guide 24. Each tooth row 27, 28 extends along the entire displacement path of the carriage 23. Although this can not be seen in particular, each tooth of the tooth rows 27, 28 comprises a lateral side having a profile of a sawtooth and which is directed transversely relative to the displacement direction of the carriage 23 and extends in the tensioning direction of the carriage 23, that is, in the direction of the conveying chain guide 17, at an acute angle to the displacement direction of the carriage 23.

The carriage 23 comprises a recess 29 on its lateral surface 231 facing the tooth rows 27, 28 and the longitudinal guide 24. The releasing key 22 has a T-section with a middle portion 30 which projects through the longitudinal guide 24 and is provided with a blind hole 31 and with a flat transverse web 32. On both sides of the middle portion 30, the transverse web 32 carries locking projections 33 and 34 on the surfaces facing the tooth rows 27, 28. A helical pressure spring 35 lies in the blind hole 31 and is supported at the base of the blind hole 31 on the one hand, and at the carriage 23 on the other hand, and accordingly presses the locking projections 33, 34 into the tooth rows 27, 28. The tooth rows 27, 28 and the releasing key 22 with locking projections 33, 34 and pressure spring 35 form the blocking mechanism 21 with the unlocking key mentioned above. A locking groove 36 and 37, respectively, is provided at the end of the each tooth row 27, 28. Although it can not be seen in more detail, the locking groove 36 and 37, respectively, comprises two parallel groove flanks extending transversely relative to the displacing direction of the carriage 23. If the locking projections 33, 34 catch in the assigned locking grooves 36, 37, this locking position of the carriage 23 can only be canceled by actuating the releasing key 22.

The carriage 23 comprises an axial blind hole 38 in which the tensioning spring 20, which is constructed as a cylinder spring, projects and is supported at the base. The other end of the tensioning spring 20 encloses a retaining pin 39 which is aligned with the pocket bore hole and is supported on a collar 40 provided at the retaining pin 39. The retaining pin 39 is held in the rear of the section housing 18. The carriage 23 is pushed in the tensioning direction of the conveying chain 10 by the action of the tensioning spring 20, wherein the conveying chain guide 17 presses against the conveying chain 10. The sawtooth-like tooth shape of the tooth rows 27, 28 allows the carriage 23 to slide in the tensioning direction when the locking projections 33, 34 engage in the tooth rows, but prevents the carriage 23 from sliding back when a force is exerted on the conveying chain guide 17 opposite the effective direction of the tensioning spring 20. Accordingly, the reversing operation of the conveyor is possible without the action of the tensioning device 12 being canceled. In the reversing operation the return portion 101 of the belt and the pulling portion 102 of the belt, respectively, move in the opposite direction relative to the arrows shown in FIG. 1.

In order to disassemble the conveying chain 10, the tensioning device 12 can be taken out of operation in a simple manner by the releasing key 22. For this purpose, the releasing key 22 is to be pressed in so that the locking projections 33, 34 are lifted out of the teeth of the tooth rows 27, 28, and the action of the blocking mechanism 21 is accordingly canceled. The carriage 23 can be slid back until its locking position at the end of the tooth rows 27, 28 accompanied by the compression of the tensioning spring 20 when the releasing key 22 is pressed in. If the releasing key 22 is released again in this locking position, the two locking projections 33, 34 catch in the locking grooves 36, 37 arranged at the end of the tooth rows 27, 28. The tensioning device 12 is reliably locked in its ineffective position. The conveying chain 10 can now be exchanged, or other work can be performed out on it. In order to put the conveyor in operation, the releasing key 22 must be pressed again, so that the locking projections 33, 34 are lifted out of the locking grooves 36, 37 and the carriage 23 is displaced by the action of the tensioning spring 20 until the conveying chain 10 has again reached its operating tension.

The invention is not limited to the described chain conveyor. The tensioning device, according to the invention, can be used in the same manner in conveyors with endless flexible conveyor belts or with circular cord. Instead of the simple deflecting roller 14, a deflecting station is often provided which is constructed identically to the drive station with the single exception that the drive motor for the sprocket wheel of the drive 11 is omitted.

While the invention has been illustrated and described as embodied in a conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A conveyor comprising an endless flexible conveying element; means for driving said conveying element; means for reversing a direction of movement of said conveying element; and at least one means for tensioning said conveying element, said tensioning means including a housing having opposite side walls, each of said opposite side walls having a longitudinal inner edge; a tensioning element engaging the conveying element and formed as a carriage displaceable between said opposite side walls; a tension spring for biasing said tensioning element into engagement with said conveying element; and a unidirectional blocking mechanism including a first group of stationary locking teeth formed in said housing and a second group of locking teeth connected with said carriage for joint displacement therewith, each tooth of said first and second groups of teeth having a lateral side which extends transverse to a direction of displacement of said carriage at an acute angle to a tensioning direction of said carriage, and a manual unlocking key supported on said carriage and carrying said second group of locking teeth, said manual unlocking key being laterally movable relative to a displacement direction of said carriage; one of said side walls defining a longitudinal guide having an opening, said tensioning device further comprising a pressure spring supported in said carriage for biasing said unlocking key in a direction transverse to the displacement direction of said carriage outward through said opening in said longitudinal guide; said first group of locking teeth including two laterally spaced rows of locking teeth formed on the inner longitudinal edge of said one side wall, said carriage having a side surface facing said two rows of locking teeth of said first group of locking teeth, and a recess, said unlocking key having a transverse web engaged in said recess, and said second group of locking teeth comprising at least two spaced locking teeth formed on said transverse web for engaging said two rows of locking teeth of said first group of locking teeth, respectively.

2. A conveyor according to claim 1, wherein said unlocking key has a central portion having a blind hole for receiving said pressure spring.

3. A conveyor according to claim 1, wherein said blocking mechanism includes two locking grooves at rear ends of said two rows of locking teeth remote from said conveying element for receiving said two locking teeth, said locking teeth disengaging from said grooves in response to actuation of said unlocking key.

4. A conveyor according to claim 1, wherein said tensioning element is positioned in a conveying path of said conveying element and has a looping angle with said conveying element less than 180°, said conveyor further comprising an additional deflection element that forms with said tensioning element an integral unit.

5. A conveyor according to claim 4, wherein said tensioning means is located between said additional deflection element and said driving means, said driving means has a looping angle with said conveying element greater than 180°.

6. A conveyor according to claim 1, wherein said tensioning element has an end engaging said conveying element, and a guide at said end for said conveying element.

7. A conveyor according to claim 1, wherein said conveying element has a return portion extending between said driving means and said reversing means, said tensioning device being arranged in said return portion.

8. A conveyor according to claim 1, wherein said conveying element comprises one of conveyor chain, conveyor belt, circular cord and the like.

* * * * *